US009482136B2

(12) United States Patent
Ancimer et al.

(10) Patent No.: US 9,482,136 B2
(45) Date of Patent: Nov. 1, 2016

(54) NOX SENSOR BASED OUTPUT DISABLEMENT IN RESPONSE TO EXHAUST SYSTEM HIGH FREQUENCY PRESSURE PULSATIONS

(71) Applicant: Cummins Inc., Columbus, IN (US)

(72) Inventors: Richard J. Ancimer, Columbus, IN (US); John Franklin Wright, Columbus, IN (US)

(73) Assignee: CUMMINS INC., Columbus, IN (US)

(*) Notice: Subject to any disclaimer, the term of this patent is extended or adjusted under 35 U.S.C. 154(b) by 341 days.

(21) Appl. No.: 14/196,106

(22) Filed: Mar. 4, 2014

(65) Prior Publication Data

US 2015/0252714 A1    Sep. 10, 2015

(51) Int. Cl.
| | | |
|---|---|---|
| F01N 11/00 | (2006.01) | |
| F01N 3/10 | (2006.01) | |
| F01N 3/20 | (2006.01) | |
| F01N 9/00 | (2006.01) | |
| F01N 3/021 | (2006.01) | |
| F01N 13/00 | (2010.01) | |

(52) U.S. Cl.
CPC ............ *F01N 11/002* (2013.01); *F01N 3/021* (2013.01); *F01N 3/106* (2013.01); *F01N 3/2066* (2013.01); *F01N 9/00* (2013.01); *F01N 13/0093* (2014.06); *F01N 2550/00* (2013.01); *F01N 2560/026* (2013.01); *F01N 2900/1402* (2013.01); *Y02T 10/24* (2013.01); *Y02T 10/47* (2013.01)

(58) Field of Classification Search
CPC ........... F01N 2560/026; F01N 11/002; F01N 11/005; F01N 2900/1406
See application file for complete search history.

(56) References Cited

U.S. PATENT DOCUMENTS

| | | | |
|---|---|---|---|
| 7,445,700 B2 | 11/2008 | Kato et al. | |
| 7,875,165 B2 | 1/2011 | Nakasone et al. | |
| 8,056,393 B2 | 11/2011 | Kawase et al. | |
| 8,308,925 B2 | 11/2012 | Muroguchi et al. | |
| 2011/0054760 A1* | 3/2011 | Ogawa ................. | F02B 25/145 701/102 |
| 2013/0104638 A1 | 5/2013 | Takahashi et al. | |

FOREIGN PATENT DOCUMENTS

| | | | | |
|---|---|---|---|---|
| JP | 2012007572 | | 1/2012 | |
| JP | WO 2012005321 A1 * | | 1/2012 | ............. F01N 3/208 |
| JP | 2012-092719 A * | | 5/2012 | |

OTHER PUBLICATIONS

Machine translation of JP 2012-092719 A, accessed on Aug. 21, 2015.*

* cited by examiner

*Primary Examiner* — Kenneth Bomberg
*Assistant Examiner* — Jonathan Matthias
(74) *Attorney, Agent, or Firm* — Taft Stettinius & Hollister LLP

(57) ABSTRACT

Systems, methods and apparatus are disclosed for disabling control of one or more outputs of an internal combustion engine system in response to an engine-out NOx sensor during a high frequency pressure pulsation associated with the exhaust gas at the engine-out NOx sensor. A high frequency pressure pulsation event may be determined in response to a pressure sensor measurement, or in response to operating parameters of one or more components of the system indicating high torque output conditions, and/or by a blade position of a turbine adjacent the NOx sensor indicating passage of the exhaust gas pressure pulsations to the NOx sensor.

29 Claims, 3 Drawing Sheets

NOX SENSOR BASED OUTPUT DISABLEMENT IN RESPONSE TO EXHAUST SYSTEM HIGH FREQUENCY PRESSURE PULSATIONS

FIELD OF THE INVENTION

The present invention relates generally to internal combustion engine systems with NOx sensors, and more particularly to disabling the determination of one or more outputs based on engine-out NOx sensor measurements in response to a high frequency pressure pulsation event in an exhaust system connected to an internal combustion engine.

BACKGROUND

NOx emission requirements and particulate standards are becoming more stringent in many markets. Internal combustion engines may be equipped with a NOx sensor in the exhaust system to determine whether the NOx levels are acceptable according to the applicable requirements, and also to optimize engine performance and control one or more outputs of the system in response to measurements from the NOx sensor.

The outputs of a NOx sensor may be monitored by an on-board diagnostic (OBD) system of the associated engine system and compared to an expected output based on one or more other known conditions to detect a fault condition associated with the NOx sensor. If the OBD indication that a NOx sensor is faulty is incorrect, unnecessary derate conditions or service events can result, increasing operating and service costs in addition to operator and owner inconvenience. Furthermore, if outputs of the system are controlled based on NOx sensor measurements during periods of operation in which the NOx sensor measurements are unreliable, engine and/or exhaust aftertreatment system performance may be compromised.

Therefore, a need remains for further improvements in systems, apparatus, and methods that determine operating conditions that result in unreliable NOx sensor outputs and/or measurements to avoid determining one or more system outputs in response to the NOx sensor measurements during such conditions.

SUMMARY

Systems, methods and apparatus are disclosed for disabling control of internal combustion engine system outputs in response to signals from an engine-out NOx sensor during a high frequency pressure pulsation event associated with the exhaust gas flow to which the engine-out NOx sensor is connected. In one embodiment, a system, method and/or apparatus is configured to detect the high frequency pressure pulsation event in response to one or more operating parameters indicating a high torque output of the engine. In further refinements for systems including a turbocharger, the blade position or open amount of the turbine blade position can also be considered in determining the high frequency pressure pulsation event.

In another embodiment, a system, method and/or apparatus is configured to disable use of an output from an engine-out NOx sensor for control of one or more internal combustion engine system outputs in response to a high frequency pressure pulsation event that is indicated by a torque output of the internal combustion engine exceeding a high torque threshold. In a further embodiment, a system, method and/or apparatus is configured to disable use of an output from an engine-out NOx sensor for control of one or more internal combustion engine system outputs in response to a pressure sensor measurement of a high frequency pressure pulsation event.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
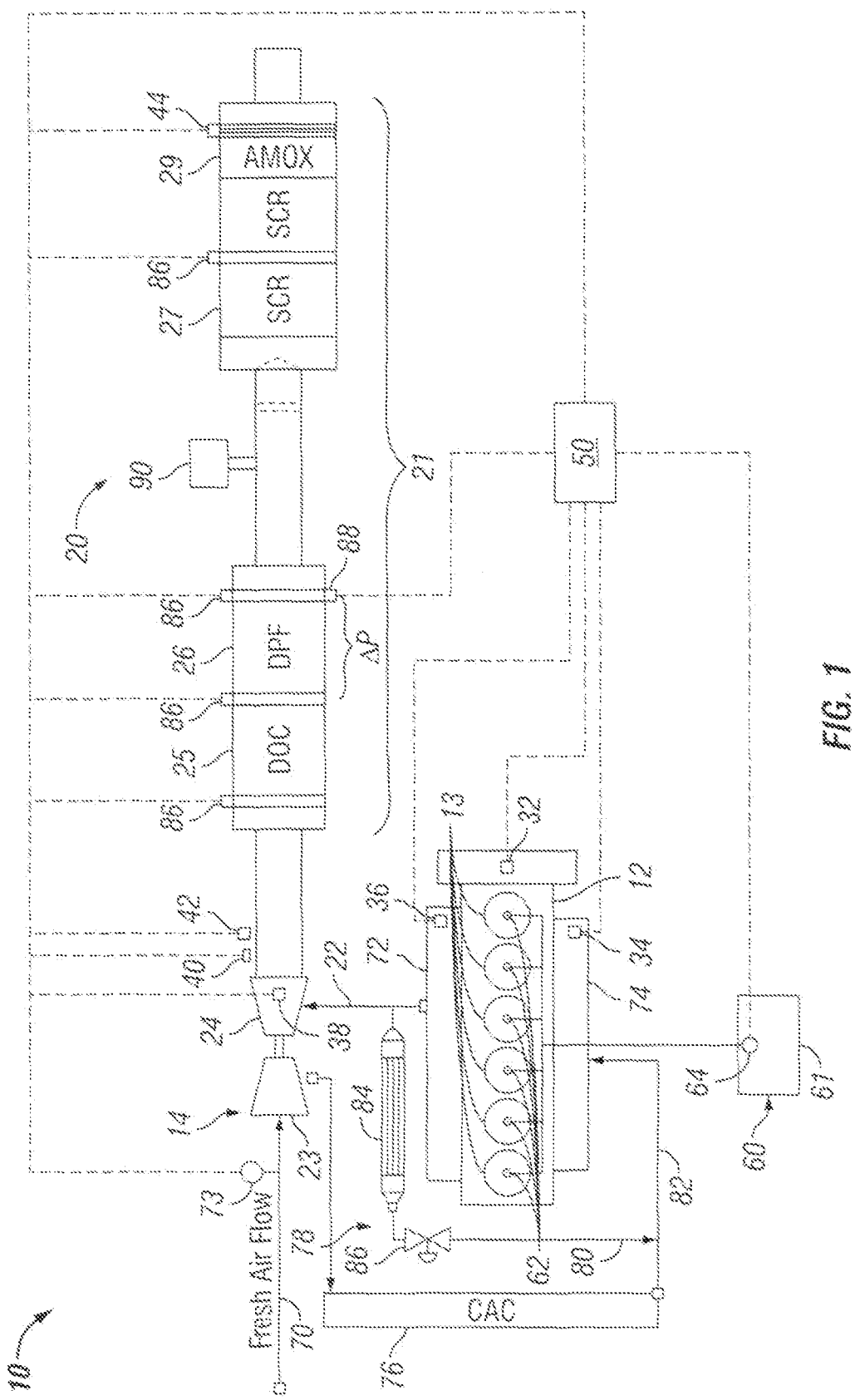
FIG. 1 is a schematic illustration of an exemplary engine system including an exemplary engine and an exemplary exhaust system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated an exemplary internal combustion engine system 10 that includes an internal combustion engine 12 and an exhaust system 20 including one or more aftertreatment components 21. Engine 12 can be a diesel engine, a gasoline engine, or any engine in which exhaust gases are produced that include NOx. System 10 may be, for example, a mobile application or vehicle powered by engine 12, or a stationary application with engine 12 utilized for applications such as power generation or pumping.

Engine 12 may include a turbocharger 14 with a compressor 23 in the intake 70 of engine 12 and a turbine 24 connected with exhaust manifold 72 of engine 12 with an exhaust conduit 22. Intake 70 may further include a charge air cooler (CAC) 76 downstream of compressor 23 that is connected to an intake manifold 74 of engine 12. Engine 12 may also include an exhaust gas recirculation (EGR) system 78 that includes an EGR conduit 80 connecting exhaust conduit 22 with an intake conduit 82 of intake 70. EGR system 78 may further include an EGR cooler 84 and EGR control valve 86. It should be understood that not all components that could be associated with an intake, exhaust, or EGR system are shown in FIG. 1, and that one or more of the illustrated components may be omitted.

System 10 may further include a fuel system 60 with a fuel source 61 connected to cylinders 13 of engine 12. Fuel source 61 may be connected to each cylinder 13 with a direct injector 62 as shown, although any suitable injector type and injection location are contemplated.

Before entering the atmosphere, the exhaust gas produced by engine 12 is treated by one or more aftertreatment components 21 of exhaust system 20. Exemplary exhaust aftertreatment components 21 include at least one of a selective catalytic reduction (SCR) catalyst 27, a diesel oxidation catalyst (DOC) 25 upstream of SCR catalyst 27, and a diesel particulate filter (DPF) 26 upstream of SCR catalyst 27 and downstream of DOC 25. In certain exemplary embodiments, the DOC 25 and DPF 26 may not be present, may be located in different locations than what is shown in FIG. 1, and/or may be provided at multiple locations. A reductant system 90 may be provided to inject a reductant, such as urea, diesel exhaust fluid, aqueous ammonia, into the exhaust gas flow. The exhaust system 20 may also include an ammonia oxidation (AMOX) catalyst 29 for treatment of ammonia slip downstream of SCR catalyst 27. Various temperature, pressure and exhaust gas constituent sensors are also contemplated, such as temperature sensors 86 and pressure sensors 88, but the inclusion of such in FIG. 1 is by way of illustration and not limitation.

SCR catalyst 27 promotes a chemical reaction between a reductant from reductant system 90 and $NO_x$ in the exhaust gas that converts substantial amounts of $NO_x$ to reduce $NO_x$ emissions before the exhaust gas passes into the atmosphere. In an exemplary embodiment, an engine-out NOx sensor 40 is located upstream of the exhaust aftertreatment components 21 and downstream of turbine 24 to measure the engine-out NOx amount in the exhaust gas before it passes through the aftertreatment components 21. In an exemplary embodiment, a second NOx sensor 44 may be located at the outlet side of the SCR catalyst 27 in the exhaust system 20 to detect the NOx amount present in the exhaust gas 22 before release into the atmosphere.

The engine system 10 further includes a controller 50. In certain embodiments, the controller 50 includes one or more modules and forms a portion of a processing subsystem including one or more computing devices having memory, processing, and communication hardware. The controller 50 may be a single device or a distributed device, and the functions of the controller may be performed by hardware or software.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or on computer readable medium, and modules may be distributed across various hardware components. More specific descriptions of certain embodiments of controller operations are included in the section referencing FIG. 2.

Certain operations described herein include operations to interpret or determine one or more parameters. Interpreting and/or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Controller 50 is in communication with any component of the engine system 10 to receive inputs relating to operating parameters and to provide outputs that, for example, interpret operating parameters, control various actuators, switches and other components, control operations of engine 12 and reductant system 90, and receive one or more signals from various sensors such as engine-out NOx sensor 40. Controller 50 is operatively coupled with and configured to store instructions in a memory which are readable and executable by controller 50 to, for example, control one or more outputs of system 10 in response to a NOx amount measured by engine-out NOx sensor 40.

In certain embodiments, NOx sensor 40 is a smart sensor that includes a dedicated controller that communicates with the controller 50 over a CAN link. NOx sensor 40 is operable to send a signal associated with a NOx measurement, along with numerous other parameters, to controller 50. Certain parameters are used to compensate the NOx signal for various effects, such as pressure or temperature, to improve the NOx measurement. Other parameters are associated with diagnostics of NOx sensor 40. For example, the NOx sensor controller can monitor the stability of a critical current in the circuit that is used to measure the electropotential associated with NOx measurement, and send an error code to controller 50 when the variation is large enough to influence the NOx measurement. It has been determined that a high frequency pressure pulsation event in the exhaust gas flow can create such instability, potentially leading a false indication that NOx sensor 40 is faulty as a result of a temporary or transient operating condition.

As shown in FIG. 1, controller 50 is operatively coupled with and may receive signals from an engine speed sensor 32 connected to engine 12, an intake manifold pressure sensor 34, an exhaust manifold pressure sensor 36, and a blade position sensor 38 for a turbine 24 that is a variable geometry turbine. In addition, controller 50 is connected to engine-out NOx sensor 40 and tailpipe or SCR outlet NOx sensor 44, a mass air flow sensor 73 that provides a measurement of the intake air flow, and a fuel sensor 64 associated with fuel system 60 that measures or outputs to controller 50 the commanded fuel flow to one or more the cylinders 13 of engine 12. Other exhaust system sensors not shown may also be connected to controller 50 to provide operating condition signals, such as charge flow rates (intake air plus EGR flow), an in-cylinder pressure of one or more cylinders 13 of engine 12, exhaust flow rates, reductant concentrations and/or amounts, oxygen amounts or concentrations, other pressure conditions, and other NOx amounts or concentrations at one or more locations in SCR catalyst 27 and exhaust system 20.

Figure 2:
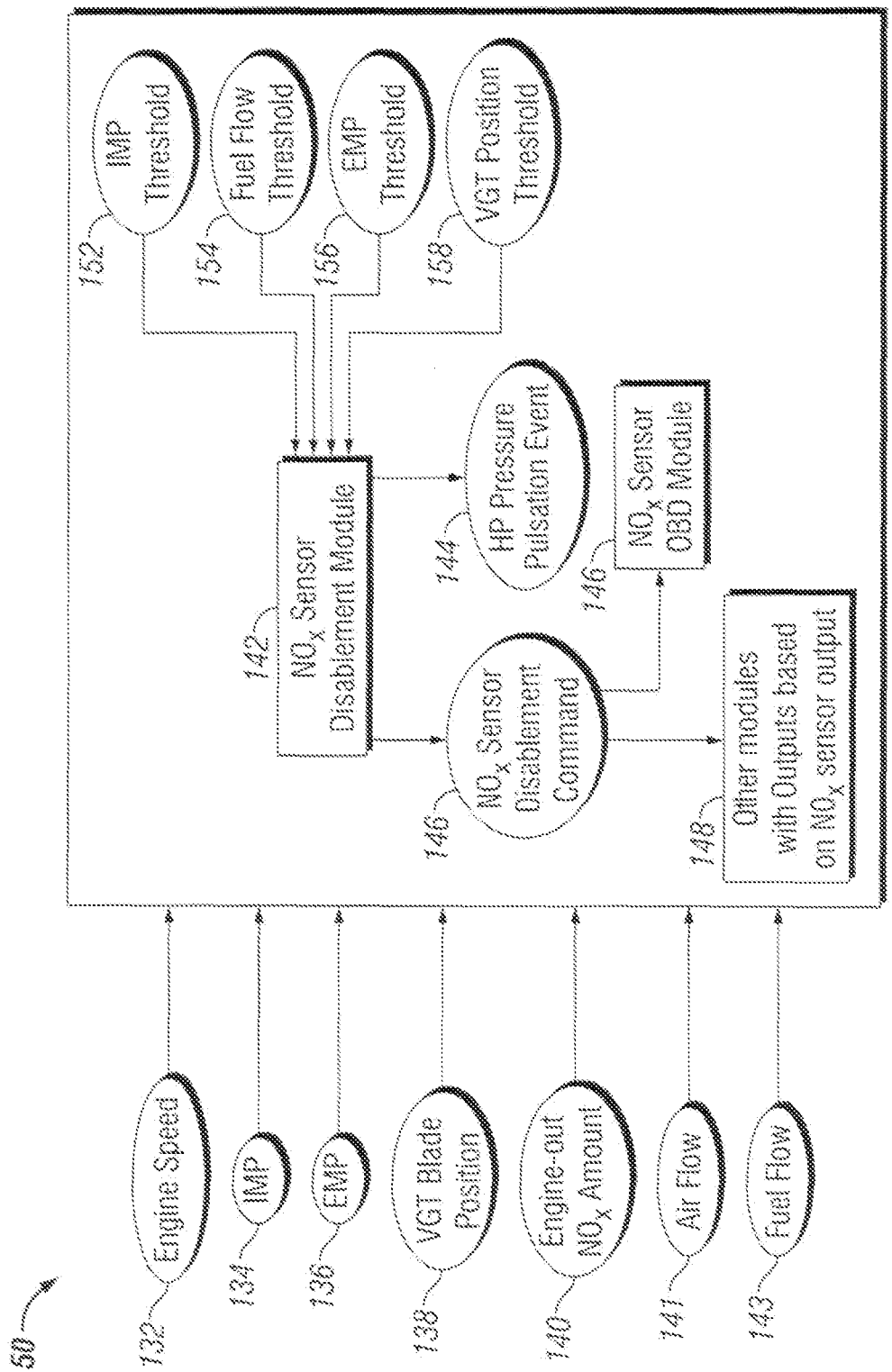
FIG. 2 is a schematic diagram illustrating a controller for controlling system operations based at least in part in response to an engine-out NOx sensor.

As shown in FIG. 2, engine speed sensor 32 is operable to provide a signal indicating the speed 132 of the engine 12 to controller 50. Intake manifold pressure sensor 34 is operable to provide a signal to controller 50 indicating the intake manifold pressure (IMP) 136 of the exhaust gas at the intake manifold 74. Exhaust manifold pressure sensor 36 is operable to provide a signal to controller 50 indicating the exhaust manifold pressure (EMP) 136 of the exhaust gas at the exhaust manifold 72. Blade position sensor 38 is operable to provide a signal to controller 50 indicating the VGT blade position 138 of the inlet of turbine 24 having a variable geometry inlet to indicate a degree of opening of the inlet of turbine 24. Engine-out NOx sensor 40 is operable to provide a signal to controller 50 indicating the NOx amount 140 in the exhaust gas downstream of turbocharger 14 and upstream of SCR catalyst 27. Tailpipe NOx sensor 44 is operable to provide a signal to controller 50 indicating the NOx amount in the exhaust gas downstream of the SCR catalyst 27. Mass air flow sensor 73 is operable to provide a signal indicative of the air flow in the intake system that is provided to the intake manifold 70 of engine 12. Fuel sensor 64 is operable to provide a signal indicative of the commanded fuel flow provided to cylinders 13 of engine 12. As used herein, except for NOx sensor 40, any one or more of the sensors disclosed herein may be physical sensors or virtual sensors that determine the indicated output from a single input sensor or a combination of sensors, an average or other determination based on a number of inputs from one or more sensors, an input from a virtual sensor, or a derived or calculated value from operating conditions.

FIG. 2 is a schematic diagram illustrating an exemplary engine controller 50 that receives a plurality of inputs to interpret a high frequency pressure pulsation event for the exhaust gas at engine-out NOx sensor 40. The inventors have determined that high frequency pressure pulsations in the exhaust gas at NOx sensor 40 result in incorrect NOx sensor measurements due to destabilization of engine-out NOx sensor 40. Therefore, controller 50 includes a NOx sensor disablement module 142 that is configured to interpret a high frequency pressure pulsation event 144 and provide an engine-out NOx sensor-based disablement command 146.

NOx sensor disablement command 146 is provided to, for example, a NOx sensor OBD module 148 to disable determination of a fault condition of engine-out NOx sensor 40 during the high frequency pressure pulsation event 144 in response to outputs from engine-out NOx sensor 40. Furthermore, other modules 148 that provide one or more outputs of system 10 that are based at least in part on inputs from engine-out NOx sensor 40 during the high frequency pressure pulsation event can be disabled from using the engine-out NOx sensor amounts 140 that are provided during the high frequency pressure pulsation event.

In one exemplary embodiment, the engine-out NOx amount 140 measured by the engine-out NOx sensor 40 is input to controller 50, which may incorporate this NOx sensor input into various control modules or algorithms 146, 148 which, in turn, may determine various outputs for system 10. For example, the NOx amount 140 measured by engine-out NOx sensor 40 may be used to determine the amount of reductant to be used in the exhaust system 20 to reduce the level of NOx in the exhaust gas, and an output to the reductant system 90 may be determined in response to the measured engine-out NOx amount 140. In another example, the NOx amount 140 measured by the engine-out NOx sensor 40 may be used by the controller 50 to perform an OBD test to determine whether engine-out NOx sensor 40 is working properly. If a determination is made by controller 50 that a high frequency pressure pulsation event is occurring in the exhaust gas that destabilizes NOx sensor 40, then the internal self-diagnostic of NOx sensor 40 is ignored or disabled and use or implementation of the engine-out NOx amounts 140 from engine-out NOx sensor 40 is disabled in determining one or more of these outputs of system 10.

As used herein, an output of system 10 that is disabled during the high frequency pressure pulsation event can be completely disabled during the event, or can be disabled from using the output from NOx sensor 40 during the event but continue to operate by using a proxy or substitute for the engine-out NOx sensor 40 measurement. It should be appreciated that the one or more outputs of system 10 disabled in response to the high frequency pressure pulsation event may include, for example, a control signal to another component of engine system 10 based at least in part on the NOx amount 140 from engine-out NOx sensor 40 during the high frequency pressure pulsation event. In another embodiment, a signal to a device such as a fault code module, an indicator lamp, a gauge, a printer, a memory device, an audible alarm, a display device, and/or other suitable indication device suitable for displaying an indication to a user, operator, service technician, or other party based at least in part on the NOx amount 140 from engine-out NOx sensor 40 during the high frequency pressure pulsation event is disabled. In a further embodiment, a NOx sensor fault determination for NOx sensor 40 based at least in part on the NOx amount from engine-out NOx sensor 40 is disabled. Combinations of one or more of these embodiments in a singled embodiment is also contemplated.

The determination of exhaust system operating conditions that are indicative of a high frequency pressure pulsation event can be based on the evaluation of various inputs from actual and/or virtual sensors associated with the engine 12 and exhaust system 20. Certain operating conditions of the engine system 10 may correlate with a high frequency pressure pulsation event in the exhaust gas produced by engine 12, and the interpretation of these conditions can be employed by controller 50 to disable use of the engine-out NOx amounts from NOx sensor 40 during such conditions to prevent, for example, a false positive indication of a fault condition of NOx sensor 40 or the use of such measurements in the control of other outputs. High frequency pressure pulsation events have been found to be associated with operation of engine 12 at or near high load or torque conditions of engine 12. Controller 50 is configured to interpret operating parameters indicative of high frequency pressure pulsations in the exhaust gas at NOx sensor 40 and a high frequency pressure pulsation event 144 in response to these operating parameters exceeding threshold amounts.

One parameter indicative of a high frequency pressure pulsation event 144 is an intake manifold pressure 134 exceeding an intake manifold pressure threshold 152. Another parameter indicative of a high frequency pressure pulsation event 144 is the fuel flow 143 exceeding a fuel flow threshold 154. Yet another parameter indicative of a high frequency pressure pulsation event 144 is exhaust manifold pressure 136 exceeding exhaust manifold pressure 156. The thresholds 152, 154, 156 can vary as a function of engine speed 132 to indicate a high frequency pressure pulsation event in response to a load on engine 12 and its relation to a high torque output of engine 12. Thus, at least one of these and other parameters exceeding a respective threshold amount in combination with engine speed can also be used to determine a high frequency pressure pulsation event. For example, the intake air flow 141, fuel flow 143 and intake manifold pressure 134 exceeding a threshold dependent on engine speed 132 exceeding an engine speed threshold, can be indicative of a high torque output that produces a high frequency pressure pulsation event 144. In one embodiment, a high torque output can be, for example, 80% of the maximum torque output of the engine 12 at the given engine speed. The torque output can be determined, for example, by referring to a map, chart, or algorithm stored in controller 50 that provides torque output amounts in response to, for example, the engine speed and one or more of the intake manifold pressure, air flow and fuel flow.

For embodiments of system 10 including a turbine 24 that is a VGT, a blade position of the VGT can provide an indication of the amount of high frequency pressure pulsations that are allowed to pass through turbine 24 to NOx sensor 40. Therefore, it is further contemplated in one embodiment that the interpretation of a high frequency pressure pulsation event 144 can further include a blade position of turbine 24 indicating an opening sufficient a threshold amount of high frequency pressure pulsations from engine 12 to pass therethrough to engine-out NOx sensor 40.

In a particular embodiment, the rate of change of the exhaust gas pressures at engine-out NOx sensor 40 sufficient to induce instability can have thresholds levels of around 185 kPa/s or more and a frequency of at least 50 Hz or more. However, other pressure pulsation amounts and frequencies are also contemplated and not precluded. Around and above these conditions, commercially available and cost effective EMP sensors 36 are not capable of measuring the exhaust gas pressure pulsations and therefore cannot be used to reliably disable use of the measurements of NOx sensor 40 in determining system outputs. Therefore, engine operating parameters that are indicative of a high frequency pressure pulsation event in the exhaust gas at engine-out NOx sensor 40 are determined to disable use of the engine-out NOx amount from the NOx sensor 40 to control the one or more outputs during the event.

In another embodiment, a high frequency pressure pulsation sensor 42 (FIG. 1) is provided at or adjacent to NOx sensor 40 and is configured to interpret high frequency pressure pulsation events by direct measurement and communicate the same to controller 50. Controller 50 can then use such an indication to disable use of the engine-out NOx amount from the NOx sensor 40 to control the one or more outputs during the event. High frequency pressure pulsation sensor 42 is configured with a sampling rate and response time sufficient to measure high frequency pressure pulsations that induce instability in engine-out NOx sensor 40.

Figure 3:
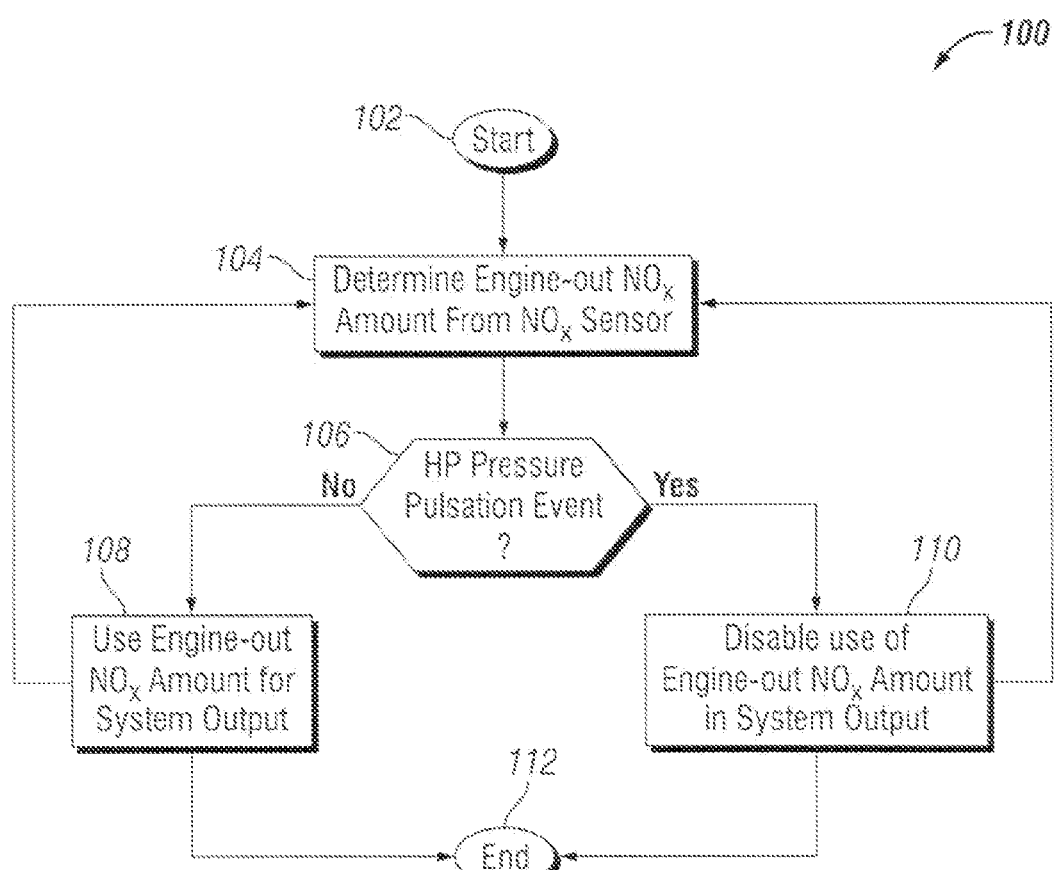
FIG. 3 is a flow diagram of a procedure for controlling system operations in response to an engine-out NOx sensor.

FIG. 3 illustrates a flow diagram of an exemplary procedure 100 for disabling use of the NOx amount measured by engine-out NOx sensor 40 in control of one or more outputs of system 10 in response to a high frequency pressure pulsation event. Procedure 100 starts at 102 in response to, for example, a key-on event, starting of engine 12, or other start indicator. Procedure 100 continues at operation 104 to determine the engine-out NOx amount from one or more signals of engine-out NOx sensor 40.

Procedure 100 continues at conditional 106 to interpret whether a high frequency pressure pulsation event is occurring. If conditional 106 is negative, procedure 100 continues at operation 108 to use the engine-out NOx amount from engine-out NOx sensor 40 to control one or more outputs of system 10. From operation 108, procedure 100 returns to operation 104, or ends at 112 in response to, for example, a key-off event or an override condition dictating procedure 100 terminate.

If conditional 106 is positive, procedure 100 continues at operation 110 to disable the use of the engine-out NOx amount from engine-out NOx sensor 40 in determining one or more outputs of system 10. As discussed above, the one or more outputs could be completely disabled, such as a NOx sensor diagnostic, or the use of the NOx amount from engine-out NOx sensor 40 could be disabled and the one or more outputs could be determined in response to a proxy for the engine-out NOx amount, such as by using a previous engine-out NOx amount or by determining or estimating the engine-out NOx amount from one or more other operating parameters. From operation 110, procedure 100 returns to operation 104, or ends at 112 in response to, for example, a key-off event or an override condition dictating termination of procedure 100.

Procedure 100 may make a determination that a high frequency pressure pulsation event is occurring at operation 106 by interpreting one or more inputs to controller 50 during operation of system 10. For example, the high frequency pressure pulsation event can be determined in response to a torque output of engine 12 exceeding a high torque output threshold. In an exemplary embodiment, the torque output may be interpreted as exceeding the high torque output threshold when at least one of the intake manifold pressure measured by intake manifold pressure sensor 34, the exhaust manifold pressure measured by exhaust manifold pressure sensor 36, the intake air flow measured by mass air flow sensor 73, and the fuel flow measured or provided by fuel flow sensor 64 exceed a respective predetermined threshold. The predetermined thresholds may be determined based on, for example, ambient conditions, engine operating conditions, or other exhaust system conditions, and can vary based on these and other conditions such as engine speed. In yet another embodiment, a high frequency pressure pulsation event may be interpreted by controller 50 based at least in part on an indication that the blade position of the variable geometry turbine 24 measured by blade position sensor 38 is open by more than a predetermined threshold amount. Again, the predetermined threshold of the blade position of the variable geometry turbine 24 may be determined based on, for example ambient conditions, engine operating conditions, or other exhaust system conditions, and can vary based on these and other conditions such as engine speed and load. In some instances, a more open position of the variable geometry turbine blades could lessen the dampening of high frequency pressure pulsations across the turbine.

Operating an internal combustion engine 12 within an engine system 10 by disabling use of the engine-out NOx sensor measurements to control of one or more outputs of system 10 in response to the occurrence of a high frequency pressure pulsation event is expected to reduce false positive indications of a fault condition of engine-out NOx sensor 40, and therefore decrease the incidence of unnecessary derate conditions, improve reductant control and reduce reductant waste, and decrease unneeded service events associated with temporary NOx sensor destabilization. The systems and methods may interpret a high frequency pressure pulsation event based on one or more inputs of various operating parameters of engine 12, such as those indicative of pressure changes exceeding 185 kPa/s and a frequency above 50 Hz. In another exemplary embodiment, the controller 50 may interpret a high frequency pressure pulsation event based on the input from a pressure sensor 42 located in exhaust system 20 so that pressure sensor 42 is subject to the same or similar pressure conditions as engine-out NOx sensor 40. Pressure sensor 42 may be located in any location where it can reliably measure the magnitude and frequency of the pressure pulsations to which engine-out NOx sensor 40 is subjected.

Various aspects of the systems and methods are disclosed herein. For example, one aspect involves a system that includes an internal combustion engine having an exhaust system for receiving an exhaust gas produced from operation of the internal combustion engine. The system also includes a plurality of sensors including at least one sensor operable to provide a signal indicating an engine speed, and at least one sensor operable to provide a signal indicating at least one of an intake manifold pressure, an exhaust manifold pressure, a fuel flow, an intake air flow, and a magnitude and frequency of pressure pulsations in the exhaust system, and an engine-out NOx sensor operable to provide a signal indicative of an engine-out NOx amount. The system further includes a controller connected to the plurality of sensors operable to interpret the signals from the plurality of sensors. The controller is configured to control one or more outputs of the system in response to the engine-out NOx amount from the NOx sensor; interpret a high frequency pressure pulsation event associated with the exhaust gas affecting a stability of the engine-out NOx sensor in response to at least one of the intake manifold pressure, the exhaust manifold pressure, the intake air flow, the fuel flow, and the magnitude and frequency of pressure pulsations in the exhaust gas exceeding a second threshold amount; and in response to the high frequency pressure pulsation event, disable use of the engine-out NOx amount from the engine-out NOx sensor to control the one or more outputs.

In one embodiment the one or more outputs of the system includes a diagnostic of the engine-out NOx sensor, and the controller is configured to disable use of the engine-out NOx amount from the engine-out NOx sensor in the to prevent a false indication of a NOx sensor fault. In another embodiment, the first threshold amount and the second threshold amount are indicative of a high torque output condition of the internal combustion engine. In a refinement of this embodiment, the high torque output condition is at least 80% of a maximum torque output of the internal combustion. In another refinement of this embodiment, the high torque output condition is interpreted in response to the intake manifold pressure exceeding the threshold amount. In yet another refinement of this embodiment, the high torque output condition is interpreted in response to the exhaust manifold pressure exceeding the threshold amount. In another refinement, the high torque output condition is interpreted in response to the fuel flow exceeding the threshold amount. In yet another refinement, the high torque output condition is interpreted in response to the intake air flow exceeding the threshold amount. In another refinement, the high torque output condition is interpreted in response to the magnitude and frequency of the pressure pulsations exceeding the threshold amount. In yet another embodiment, the threshold amount varies as a function of the engine speed.

In yet another embodiment of the system, the exhaust system includes a variable geometry turbine and the engine-out NOx sensor is located at an outlet of the variable geometry turbine. The controller is further configured to interpret the high frequency pressure pulsation event in response at least in part to a blade position of the variable geometry turbine being open more than a predetermined amount. In a refinement of this embodiment, the exhaust system includes at least one aftertreatment component downstream of the NOx sensor. In a further refinement, the at least one aftertreatment component includes at least one of an oxidation catalyst, a particulate filter, and a selective catalytic reduction catalyst. In yet another embodiment, the system includes an exhaust gas recirculation system including an exhaust gas recirculation conduit connecting the exhaust system upstream of a variable geometry turbine to an intake system of the engine.

According to another aspect, a method is disclosed that includes operating an internal combustion engine to produce an exhaust gas into an exhaust system; determining an engine-out NOx amount with an engine-out NOx sensor in the exhaust system; controlling one or more outputs associated with operation of the internal combustion engine in response to the engine-out NOx amount; interpreting a high frequency pressure pulsation event associated with the exhaust gas at the engine-out NOx sensor; and disabling use of the engine-out NOx amount from the engine-out NOx sensor during the high frequency pressure pulsation event to control the one or more outputs.

In one embodiment of the method, interpreting the high frequency pressure pulsation event includes determining at least one of an intake manifold pressure, an exhaust manifold pressure, an intake air flow, and a fuel flow exceeds a second threshold amount. In a refinement of this embodiment, the one or more outputs includes a diagnostic of the engine-out NOx sensor and disabling use of the engine-out NOx amount from the engine-out NOx sensor during the high frequency pressure pulsation event includes disabling the diagnostic to prevent a false positive determination of a fault for the engine-out NOx sensor.

In another embodiment, the high frequency pressure pulsation event includes a pressure change in the exhaust gas of at least 185 kPa/second at a frequency of at least 50 Hz. In yet another embodiment, the engine-out NOx sensor is located downstream of a turbine in the exhaust system and upstream of a selective catalytic reduction catalyst in the exhaust system. In a refinement of this embodiment, the turbine is a variable geometry turbine, and interpreting the high frequency pressure pulsation event includes determining an opening of the variable geometry turbine is more than a threshold amount to permit passage of exhaust gas pressure pulsations therethrough.

In another embodiment, interpreting the high frequency pressure pulsation event includes measuring a magnitude of exhaust gas pressure changes and a frequency of the exhaust gas pressure changes with a pressure sensor adjacent the engine-out NOx sensor. The pressure sensor can be located at or near the outlet of a turbine in the exhaust system and upstream of any aftertreatment components in the exhaust system.

According to yet another aspect, a method is disclosed that includes operating an internal combustion engine to produce an exhaust gas including at least in part an engine-out NOx amount determined by an engine-out NOx sensor in an exhaust system connected to the internal combustion engine; determining a fault condition of the engine-out NOx sensor in response at least in part to the engine-out NOx amount determined by the engine-out NOx sensor; interpreting a high frequency pressure pulsation event associated with an exhaust gas produced by operation of the internal combustion engine; and in response to the high frequency pressure pulsation event, disabling determining the fault condition of the engine-out NOx sensor during the high frequency pressure pulsation event.

In one embodiment of the method, disabling determining the fault condition of the engine-out NOx sensor includes disabling any self-diagnostics of the engine-out NOx sensor during the high frequency pressure pulsation event. In another embodiment, the high frequency pressure pulsation event includes pressure changes in the exhaust gas of at least 185 kPa/second at a frequency of at least 50 Hz.

In yet another embodiment of the method, interpreting the high frequency pressure pulsation event includes determining at least one of an intake manifold pressure, an exhaust manifold pressure, an intake air flow, and a fuel flow exceeds a threshold amount. In another embodiment, interpreting the high frequency pressure pulsation event includes determining an output of the internal combustion engine is at least 80% of a maximum torque output.

In another embodiment, the engine-out NOx sensor is located downstream of a turbine in the exhaust system and upstream of at least a selective catalytic reduction catalyst in the exhaust system. In a refinement of this embodiment, the turbine is a variable geometry turbine, and interpreting the high frequency pressure pulsation event includes determining an opening of the variable geometry turbine is more than a threshold amount to permit passage of exhaust gas pressure pulsations therethrough.

In another embodiment, interpreting the high frequency pressure pulsation event includes measuring a magnitude of exhaust gas pressure changes and a frequency of the exhaust gas pressure changes with a pressure sensor in the exhaust system.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine having an exhaust system for receiving an exhaust gas produced from operation of the internal combustion engine;
a plurality of sensors including at least one sensor operable to provide a signal indicating an engine speed and at least one sensor operable to provide a signal indicating at least one of an intake manifold pressure, an exhaust manifold pressure, a fuel flow, an intake air flow, and a magnitude and frequency of pressure pulsations in the exhaust gas, the plurality of sensors further including at least one engine-out NOx sensor operable to provide a signal indicative of an engine-out NOx amount;
a controller connected to the plurality of sensors operable to interpret the signals from the plurality of sensors, wherein the controller is configured to:
control one or more outputs of the system in response to the engine-out NOx amount from the NOx sensor;
interpret a high frequency pressure pulsation event associated with the exhaust gas affecting a stability of the engine-out NOx sensor in response to at least one of the intake manifold pressure, the exhaust manifold pressure, the fuel flow, the intake air flow, and the magnitude and frequency of pressure pulsations exceeding a threshold amount; and
in response to the high frequency pressure pulsation event, disable use of the engine-out NOx amount from the engine-out NOx sensor to control the one or more outputs.

2. The system of claim 1, wherein the one or more outputs of the system includes a diagnostic of the engine-out NOx sensor and the controller is configured to disable use of the diagnostic in response to the high frequency pressure pulsation event to prevent a false indication of a NOx sensor fault.

3. The system of claim 1, wherein the threshold amount is indicative of a high torque output condition of the internal combustion engine.

4. The system of claim 3, wherein the high torque output condition is at least 80% of a maximum torque output of the internal combustion.

5. The system of claim 3, wherein the high torque output condition is interpreted in response to the intake manifold pressure exceeding the threshold amount.

6. The system of claim 3, wherein the high torque output condition is interpreted in response to the exhaust manifold pressure exceeding the threshold amount.

7. The system of claim 3, wherein the high torque output condition is interpreted in response to the fuel flow exceeding the threshold amount.

8. The system of claim 3, wherein the high torque output condition is interpreted in response to the intake air flow exceeding the threshold amount.

9. The system of claim 3, wherein the high torque output condition is interpreted in response to the magnitude and frequency of the pressure pulsations exceeding the threshold amount.

10. The system of claim 1, wherein the threshold amount varies as a function of the engine speed.

11. The system of claim 1, wherein:
the exhaust system includes a variable geometry turbine;
the engine-out NOx sensor is located at an outlet of the variable geometry turbine; and
the controller is further configured to interpret the high frequency pressure pulsation event in response at least in part to a blade position of the variable geometry turbine being open more than a predetermined amount.

12. The system of claim 1, wherein the exhaust system includes at least one aftertreatment component downstream of the engine-out NOx sensor.

13. The system of claim 12, wherein the at least one aftertreatment component includes at least one of an oxidation catalyst, a particulate filter, and a selective catalytic reduction catalyst.

14. The system of claim 1, wherein the exhaust system includes a variable geometry turbine and further comprising an exhaust gas recirculation system including an exhaust gas recirculation conduit connecting the exhaust system upstream of the variable geometry turbine to an intake system of the engine.

15. A method, comprising:
operating an internal combustion engine to produce an exhaust gas into an exhaust system;
determining an engine-out NOx amount with an engine-out NOx sensor in the exhaust system;
controlling one or more outputs associated with at least one of an operation of the internal combustion engine and an operation of an aftertreatment system in the exhaust system in response to the engine-out NOx amount;
interpreting a high frequency pressure pulsation event associated with the exhaust gas at the engine-out NOx sensor; and
disabling use of the engine-out NOx amount from the engine-out NOx sensor during the high frequency pressure pulsation event to control the one or more outputs.

16. The method of claim 15, wherein interpreting the high frequency pressure pulsation event includes determining at least one of an intake manifold pressure, an exhaust manifold pressure, an intake air flow, and a fuel flow exceeds a threshold amount.

17. The method of claim 15, wherein the one or more outputs includes a diagnostic of the engine-out NOx sensor and disabling use of the engine-out NOx amount from the engine-out NOx sensor during the high frequency pressure pulsation event includes disabling the diagnostic to prevent a false positive determination of a fault for the engine-out NOx sensor.

18. The method of claim 15, wherein the high frequency pressure pulsation event includes a pressure change in the exhaust gas of at least 185 kPa/second at a frequency of at least 50 Hz.

19. The method of claim 15, wherein the engine-out NOx sensor is located downstream of a turbine in the exhaust system and upstream of a selective catalytic reduction catalyst in the exhaust system.

20. The method of claim 19, wherein the turbine is a variable geometry turbine, and interpreting the high frequency pressure pulsation event includes determining an opening of the variable geometry turbine is more than a threshold amount to permit passage of exhaust gas pressure pulsations therethrough.

21. The method of claim 15, wherein interpreting the high frequency pressure pulsation event includes measuring a magnitude of exhaust gas pressure changes and a frequency of the exhaust gas pressure changes with a pressure sensor in the exhaust system.

22. A method, comprising:
operating an internal combustion engine to produce an exhaust gas including at least in part an engine-out NOx amount determined by an engine-out NOx sensor in an exhaust system connected to the internal combustion engine;
determining a fault condition of the engine-out NOx sensor in response at least in part to the engine-out NOx amount determined by the engine-out NOx sensor;
interpreting a high frequency pressure pulsation event associated with an exhaust gas produced by operation of the internal combustion engine; and
in response to the high frequency pressure pulsation event, disabling determining the fault condition of the engine-out NOx sensor during the high frequency pressure pulsation event.

23. The method of claim 22, wherein disabling determining the fault condition of the engine-out NOx sensor includes disabling any self-diagnostics of the engine-out NOx sensor during the high frequency pressure pulsation event.

24. The method of claim 22, wherein the high frequency pressure pulsation event includes pressure changes in the exhaust gas of at least 185 kPa/second at a frequency of at least 50 Hz.

25. The method of claim 22, wherein interpreting the high frequency pressure pulsation event includes determining at least one of an intake manifold pressure, an exhaust manifold pressure, an intake air flow and a fuel flow exceeds a threshold amount.

26. The method of claim 22, wherein interpreting the high frequency pressure pulsation event includes determining an output of the internal combustion engine is at least 80% of a peak torque output.

27. The method of claim 22, wherein the engine-out NOx sensor is located downstream of a turbine in the exhaust system and upstream of at least a selective catalytic reduction catalyst in the exhaust system.

28. The method of claim 27, wherein the turbine is a variable geometry turbine, and interpreting the high frequency pressure pulsation event includes determining an opening of the variable geometry turbine is more than a threshold amount to pelinit passage of exhaust gas pressure pulsations therethrough.

29. The method of claim 22, wherein interpreting the high frequency pressure pulsation event includes measuring a magnitude of exhaust gas pressure changes and a frequency of the exhaust gas pressure changes with a pressure sensor adjacent the engine-out NOx sensor.

* * * * *